United States Patent [19]

Kanamori

[11] 3,903,463

[45] Sept. 2, 1975

[54] SELF-EXCITING DIRECT CURRENT MOTORS HAVING MEANS FOR PREVENTING REVERSE ROTATION

[75] Inventor: Junichi Kanamori, Kakegawa, Japan

[73] Assignee: Sansui Electric Co., Ltd., Tokyo, Japan

[22] Filed: Mar. 29, 1974

[21] Appl. No.: 456,304

[30] Foreign Application Priority Data

Mar. 31, 1973 Japan.............................. 48-36966

[52] U.S. Cl.................................. 318/138; 318/254
[51] Int. Cl.²...................................... H02K 29/00
[58] Field of Search................... 318/138, 171, 254

[56] References Cited
UNITED STATES PATENTS

| | | | |
|---|---|---|---|
| 3,025,443 | 3/1962 | Wilkinson et al.................. | 318/138 |
| 3,050,671 | 8/1962 | Möller............................ | 318/138 X |
| 3,091,728 | 5/1963 | Hogan et al...................... | 318/138 |
| 3,264,539 | 8/1966 | Sander............................ | 318/138 |
| 3,339,133 | 8/1967 | Favre............................. | 318/138 |
| 3,346,792 | 10/1967 | Noumi............................. | 318/138 |

*Primary Examiner*—G. Z. Rubinson
*Attorney, Agent, or Firm*—Harris, Kern, Wallen & Tinsley

[57] ABSTRACT

A self-exciting direct current motor comprising a field coil and an armature coil wound on the same magnetic pole of the stator, a position detector which detects the position of the rotor of the motor and produces an output, a self-exciting circuit including an amplifying transistor for amplifying the half cycle outputs of the armature coil and position detector to supply current to the field coil so as to self-excite the motor, and a servo amplifier for controlling the rotor speed at a predetermined servo speed. The half cycle of the detector output which always gives a forward rotation torque to the motor is amplified by the amplifying transistor. The rectified output level is set to be greater than the level of the half cycle of the electromagneto motive force from the armature coil within the servo speed, thereby preventing reverse rotation of the rotor when the rotor is applied an external reverse starting torque.

1 Claim, 4 Drawing Figures

SELF-EXCITING DIRECT CURRENT MOTORS HAVING MEANS FOR PREVENTING REVERSE ROTATION

BACKGROUND OF THE INVENTION

This invention relates to a self-exciting DC motor provided with means for detecting the position of the rotor for starting the motor and a servo amplifier for holding the number of revolutions at a definite value, and more particularly to a self-exciting DC motor provided with means for preventing reverse rotation.

A turn table of a record player is often directly coupled to the rotary shaft of a servo motor whose speed is precisely controlled at a constant low speed thereby eliminating the use of any intermediate transmission system.

Such a servo motor is of course required to rotate precisely at a definite speed with a minimum speed variation and mechanical oscillation. More important is that such motor can readily self start and does not rotate in the opposite direction.

A self-exciting DC motor utilized as such servo motor generally comprises the following component elements. More particularly, it comprises a rotor including a plurality of magnetic poles in the form of permanent magnets, a stator including a plurality of magnetic poles respectively wound with field coils or field windings and armature coils or generator windings, means for detecting a starting position which detects the angular position of the rotor for generating a position signal of the rotor, a self-exciting circuit including an amplifier for amplifying the position signal and the electromotive force induced in the armature winding in accordance with the rotation of the rotor for supplying a field current to the field windings and a servo amplifier for controlling the field current in accordance with the rotational speed of the rotor for maintaining the rotor speed at a constant speed.

Such a system is advantageous in that it can correctly detect the position of the rotor in accordance with the output from the armature winding, that it has an excellent rotating characteristic because the waveform and oscillation of the output of the armature winding are uniform at the constant running speed, and that the speed of the rotor can be readily regulated by controlling the field current, but is not advantageous in that it is necessary to provide means for detecting the starting position because the motor can not self-start and that when an external starting torque is applied, the direction of rotation of the motor is determined by the direction of the applied external starting torque.

Where the DC self-exciting servo motor is used in the direct drive system described above, there may be a case in which the external force is inadvertently applied in the opposite direction thus causing the motor to start and run in the opposite direction. Although said means for detecting the starting position is constructed to drive the rotor in a predetermined or forward direction with its output, the output of the armature winding acts to drive the rotor in the direction of its first rotation. Therefore, if the reverse torque caused by the external force is large, the motor will be driven in the reverse direction irrespective of the fact that the position detecting means produces a forward torque.

Accordingly, it is an object of this invention to provide a novel self-exciting DC motor capable of preventing reverse rotation even when a reverse torque is applied to the rotor by an external force.

SUMMARY OF THE INVENTION

According to this invention, there is provided a self-exciting direct current motor of the type comprising a rotor having a plurality of magnetic poles in the form of a permanent magnet, a stator having a plurality of magnetic poles respectively wound with field coils and armature coils, starting position detecting means which detects the angular position of the rotor for producing a position signal of the rotor, a self-exciting circuit including an amplifier for amplifying the position signal and an electromotive force induced in the armature coils by the rotation of the rotor to supply a self-exciting field current to the field coils thereby causing the motor to rotate continuously, and a servo amplifier which detects the rotary speed of the rotor for controlling the field current in response to the detected speed thereby controlling the rotary speed of the motor at a predetermined servo speed, characterized in that the starting position detecting means comprises a plurality of detecting elements which are designed to produce positive half cycle outputs larger than the positive half cycle outputs of the corresponding armature coils at a speed lower than the servo speed, and that the self-exciting circuit includes first means for amplifying the positive half cycle outputs of the position detecting elements, the half cycle outputs exiting the field coils to drive the rotor in the forward direction, and for amplifying the positive half cycle outputs of the corresponding armature coils, the half cycle outputs having the same phase as the positive half cycle outputs of the position detecting elements and exiting the field coils to drive the rotor in the forward direction, thus driving the rotor in the forward direction when the rotor rotates in the forward direction, and second means for amplifying the positive half cycle outputs of the position detecting means, the half cycle outputs exciting the field coils to drive the rotor in the forward direction and for amplifying the positive half cycle outputs of the corresponding armature coils, the half cycle outputs having a different phase from the positive half cycle outputs of the position detecting elements and exciting the field coils to drive the rotor in the reverse direction, thus preventing reverse rotation of the rotor when the rotor is applied an external reverse starting torque. Ω

DESCRIPTION OF THE PREFERRED EMBODIMENT

Figure 1:
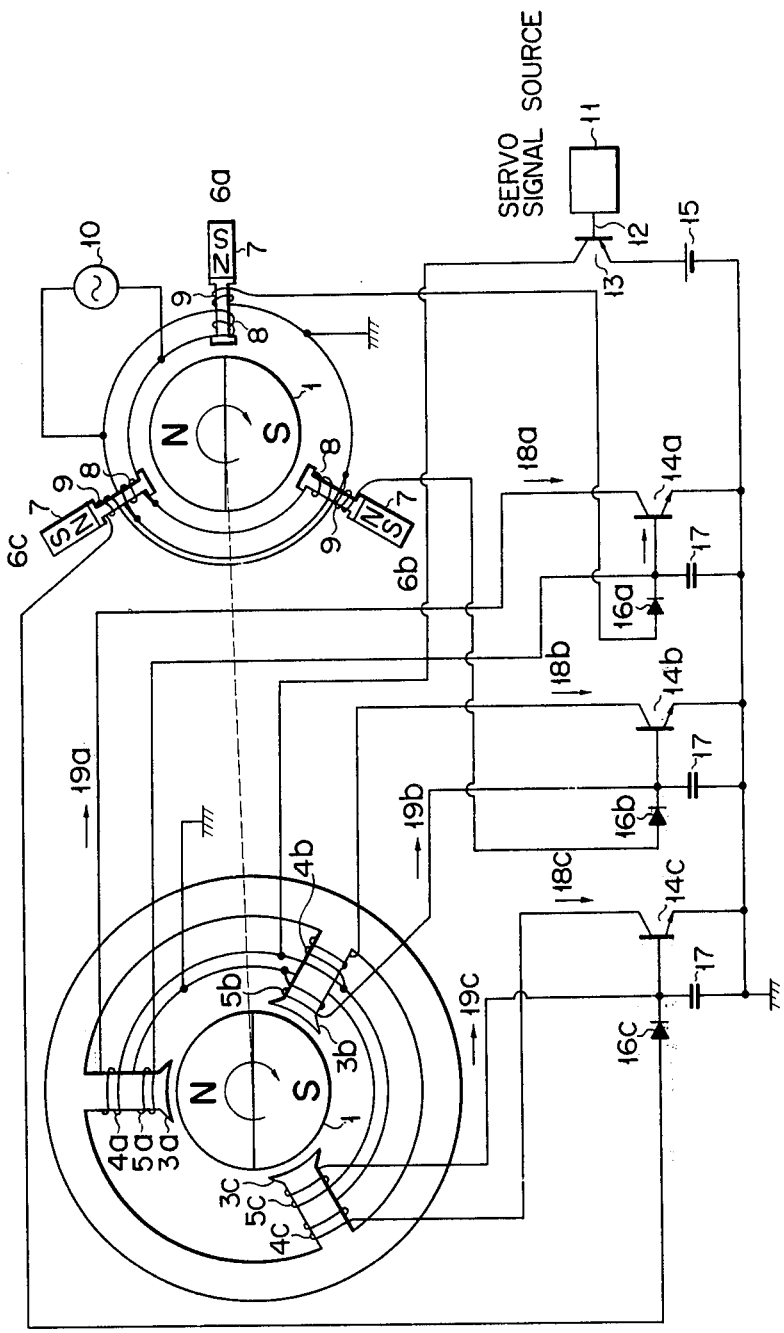
FIG. 1 is a connection diagram of one embodiment of this invention.

Referring now to FIG. 1 of the accompanying drawings, a rotor 1 having a shaft, not shown, is provided with an N pole and an S pole in the form of a permanent magnet, and a stator 2 is provided with three equally spaced apart magnetic poles 3a, 3b and 3c. Field coils 4a, 4b and 4c and armature coils 5a, 5b and 5c are wound upon the magnetic poles 3a, 3b and 3c. Equally spaced apart position detecting elements 6a, 6b and 6c which comprise position detecting means are supported by stator 2 to surround an extension of the rotor (shown to the righthand side in FIG. 1). In this embodiment, the magnetic poles 3a, 3b and 3c are shown to correspond to position detection elements 6a, 6b and 6c respectively when the rotor rotates in the forward direction, and the position detecting element 6a is shown at a position 90° more advanced than the stator magnetic pole 3a in the direction of the forward rotation indicated by an arrow.

Respective position detecting elements are shown as comprising magnetic modulators each including a core magnetically saturated by a biasing permanent magnet 7 and high frequency coils 8 and 9 wound upon the core. Coils 8 are connected in parallel across a high frequency source 10 and one ends of coils 9 are commonly connected to the ground. In this embodiment, the rotor and position detecting means are constructed such that only the core which comes to oppose the N pole of the rotor is demagnetized to produce an output from coil 9 associated therewith.

A servo amplifier 11 is provided for detecting the rotary speed of the rotor in accordance with the magnetomotive forces induced in the armature coils 5a, 5b and 5c for supplying a servo 12 signal corresponding to the rotor speed to the base electrode of a current control transistor 13. Further, a DC source 15 is provided for supplying the operating current to NPN transistor amplifier elements 14a, 14b and 14c and the field current to the field coils 4. One terminal of the field coils 4a, 4b and 4c are connected to the collector electrodes of respective transistors 14a, 14b and 14c while the other terminals are connected to the collector electrode of the current control transistor 13. One terminal of the coils 9 of the position detecting elements 6a, 6b and 6c are connected to the base electrodes of transistors 14a, 14b and 14c respectively through diodes 16a, 16b and 16c, poled as shown, while the other terminals of the coils 9 are grounded. The emitter electrodes of transistors 14a, 14b and 14c are connected to the grounded negative pole of the DC source 15. The positive pole of this source is connected to the emitter electrode of the switching transistor element 13 while the collector electrode thereof is connected to the other terminals of the field coils. A capacitor 17 is connected across base and emitter electrodes of each of the transistors 14a, 14b and 14c. Field coils 4a, 4b and 4c are wound such that when field currents 18a, 18b and 18c flow therethrough in the directions of arrows they produce N poles on magnetic poles 3a, 3b and 3c respectively, and the armature coils 5a, 5b and 5c are wound such that electromotive forces 19a, 19b and 19c in the indicated direction are induced in the coils 5 respectively by the shifting magnetic flux, when the rotor poles change their polarity from N to S under the poles 3.

The outputs from the coils 9 of the position detecting elements 6a, 6b and 6c vary between positive and negative, but only their positive half cycles are rectified by diodes 16a, 16b and 16c to apply positive biases to the base electrodes of corresponding transistors 14a, 14b and 14c. The positive half cycle outputs of the position detecting elements are selected such that they are larger than the positive half cycle outputs of the corresponding armature coils, when the speed of the rotor is lower than a predetermined speed set by the servo mechanism.

In operation, while the rotor 1 is at standstill, a servo signal 12 maintains PNP transistor in its ON state. Under these conditions, a coil 9 of a position detecting element now opposing the N pole of the rotor produces a high frequency position signal which is rectified by diode 16 and smoothed by capacitor 17 whereby a smooth DC bias is applied to the base electrode of a corresponding one of transistors 14a, 14b and 14c. The amplified output of this rectified position signal is applied to a corresponding one of the field coils 4a, 4b and 4c so that the rotor begins to rotate. As the rotor rotates, the N pole thereof comes to successively oppose the magnetic poles of the stator, so that the rotor continues its rotation in the direction of the arrow. Of the electromotive forces induced in the armature coils 5a, 5b and 5c caused by the rotation of the rotor, only one of the electromotive forces 18a, 18b and 18c which has a polarity as shown in the drawing is amplified by a corresponding one of the transistors 14a, 14b and 14c so as to supply a field current corresponding to this speed to one of the field coils thereby gradually increasing the speed of the rotor.

As the servo amplifier 11 operates to control the current control transistor 13 with control signal 12 corresponding to a speed of the rotor, the rotor will be accelerated to a prescribed servo speed and runs at that speed.

Figure 2:
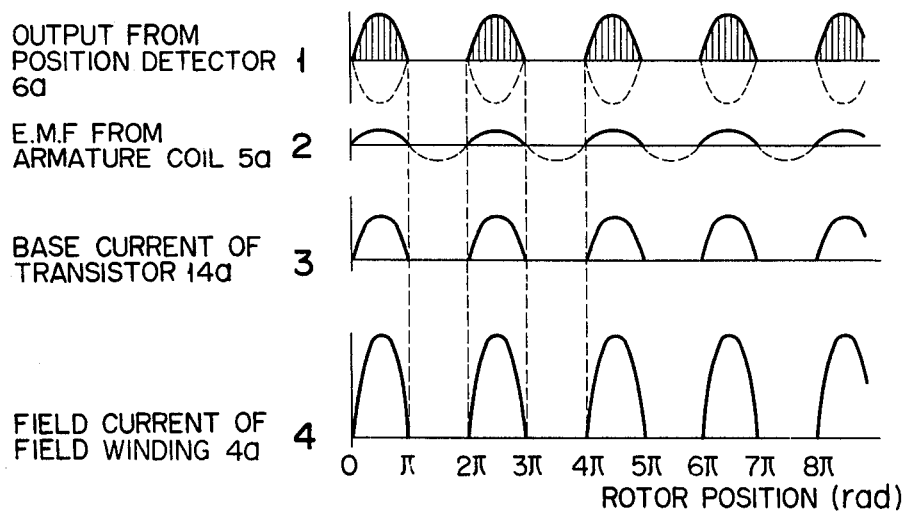
FIG. 2 shows the phase relations of the waveforms of voltages and currents at various portions of the position detecting means and the self-excitation circuit of the circuit shown in FIG. 1 when the rotor rotates in the forward direction.
Figure 3:
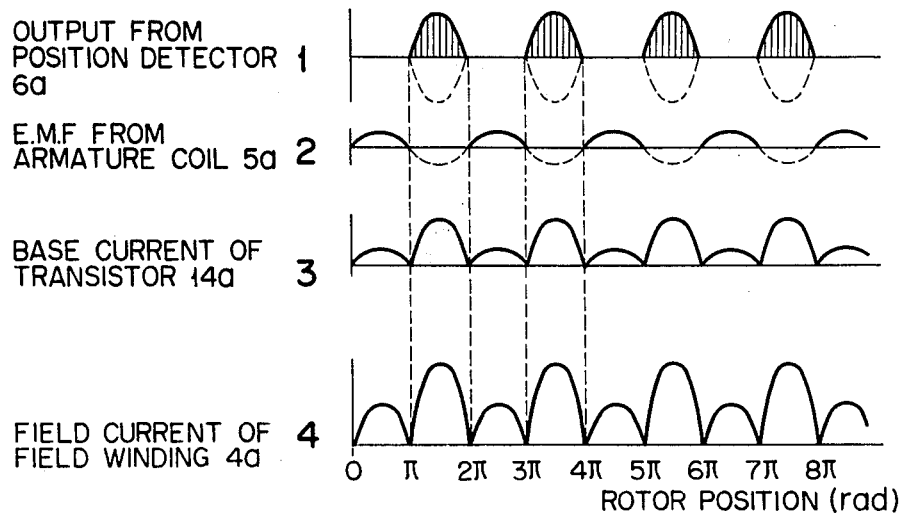
FIG. 3 shows similar waveforms as those shown in FIG. 2 when the rotor rotates in the reverse direction.
Figure 4:
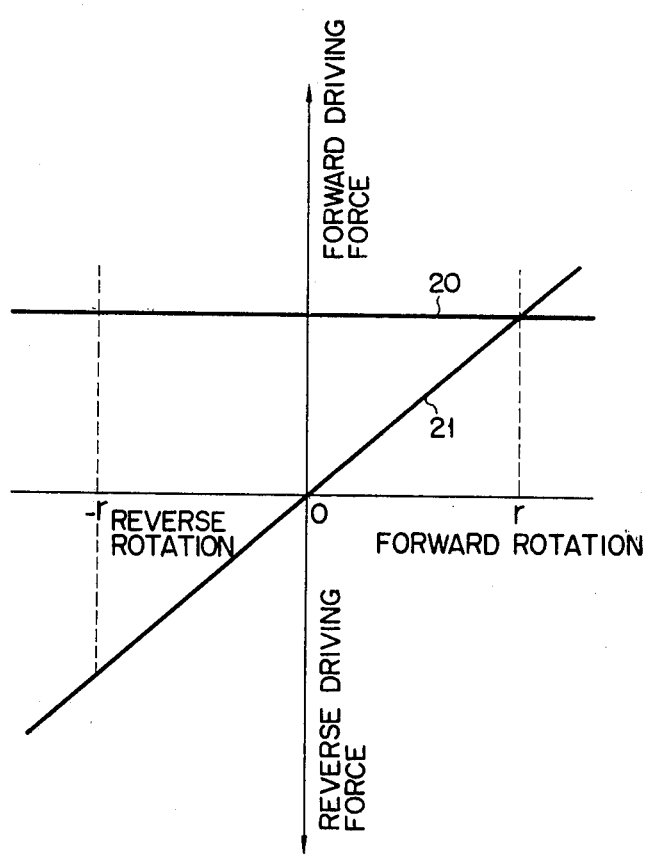
FIG. 4 is a graph showing the relation between the forward torque caused by the output from the position detecting means shown in FIG. 1 and the forward and reverse torques caused by the output from the armature winding at a definite servo motor speed.

FIG. 2–1 shows the output waveform of a detecting element 6a (solid lines show rectified positive half cycles), FIG. 2—2 the output waveforms of a corresponding armature coil 5a (solid lines show the electromotive force 19a when the rotor rotates in the direction of arrow), FIG. 2–3 the waveforms of the base current of the amplifying transistor 14a and FIG. 2–4 the output waveform of the amplifying transistor 14a, in which the abscissa represents the rotary position of the rotor. As can be noted from FIG. 2, the positive half cycle output shown in FIG. 2–1 is in phase with the positive half cycle output shown in FIG 2—2 and these outputs cooperate to produce forward torque during the periods of $0-\pi$, $2\pi-3\pi$ . . . radians. The same relation also holds true for other phases so that it is clear that the rotor runs continuously in the forward direction.

Let us now consider a case wherein the rotor is rotated in the reverse direction by an external force with reference to FIG. 3. In this case, the positive half cycle output of the position detecting element 6a is shown by solid lines in FIG. 3–1, which is applied to the base electrode of transistor 14a as shown in FIG. 3—3 thus passing field current through field coil 4a for driving the rotor in the forward direction during the periods $\pi-2\pi$, $3\pi-4\pi$ . . . radians. The electromotive force induced in the armature coil 5a will have a waveform as shown in FIG. 3–2, and only when its positive half cycle output shown by solid lines is applied to the base electrode of transistor 14a, a base current as shown in FIG.

3—3 flows through this base electrode to pass a field current through the field coil 4a during the periods $0-\pi$, $2\pi-3\pi$, ... as shown in FIG. 3–4. The field current flowing through the field coil 4a during these periods creates a torque tending to rotate the rotor in the reverse direction. For this reason, the forward torque generated by the positive half cycle output of the position detecting element 6a during the periods $\pi-2\pi$, $3\pi-4\pi$ ... acts as a braking force for the reverse torque generated by the positive half cycle output of the armature coil 5a during the periods $0-\pi$, $2\pi-3\pi$ .... While foregoing description refers to only one phase, it will be clear that the same relation also holds true for other phases.

As described hereinabove, in accordance with this invention, as long as the motor speed is lower than a predetermined servo speed, the positive half cycle output of each position detecting element is made to be larger than the positive half cycle output of a corresponding armature coil so that unless the rotor is caused to rotate at a speed higher than the servo speed by an external force, it is possible to positively prevent the rotor from being rotated in the reverse direction.

FIG. 4 shows a relationship between the rotor driving forces based on outputs from the position detecting elements and the armature coils and the running speed of the rotor, in which the abscissa represents the rotor speed. $\gamma$ is the servo speed set by the servo system. The ordinate indicates the torque acting upon the rotor. Straight line 20 shows the output of the position detecting element which always applies a positive torque to the rotor, whereas an inclined straight line 21 shows the output of an armature coil showing that it applies a forward torque when the rotor rotates in the forward direction but a reverse torque when the rotor rotates in the reverse direction. The forward servo speed ($+\gamma$) does not effect the rotational direction in any way. However, when a speed exceeding the negative servo speed ($-\gamma$) is applied to the rotor by an external force, it is impossible to prevent reverse rotation of the rotor, but when a speed not exceeding the negative servo speed ($-\gamma$) is applied by the external force, since the forward torque indicated by line 20 is larger than the reverse torque shown by line 21, it is possible to completely prevent the reverse rotation of the rotor. By setting the output of the position detecting element to be much higher than the output of the armature coil at the servo speed it is possible to reduce the time necessary for automatically changing the direction of rotation from reverse to forward direction as can be clearly understood from FIG. 4.

It should be understood that the number of poles of the rotor is not limited to that illustrated. Further, the magnetic modulation type position detecting elements may be substituted by the position detecting element utilizing a photoelectric element or a Hall element.

What we claim is:

1. In a self-exciting direct current motor of the type comprising a rotor having a plurality of magnetic poles in the form of a permanent magnet; a stator having a plurality of magnetic poles respectively wound with field coils and armature coils; starting position detecting means which detects the angular position of said rotor for producing a position signal of the rotor; a self-exciting circuit including an amplifier for amplifying said position signal and an electromotive force induced in said armature coils by the rotation of said rotor to supply a self-exciting field current to said field coils thereby causing said rotor to rotate continuously; and a servo amplifier which detects the rotating speed of said rotor for controlling said field current in response to the detected speed thereby controlling the rotating speed of said motor at a predetermined servo speed, the improvement wherein said starting position detecting means comprises a plurality of detecting elements which are designed to produce positive half cycle outputs larger than the positive half cycle outputs of the corresponding armature coils at a speed lower than said predetermined servo speed, and said self-exciting circuit includes means for amplifying the positive half cycle outputs of said position detecting elements, said half cycle outputs exciting the field coils to drive the rotor in the forward direction and for amplifying the positive half cycle outputs of the corresponding armature coils, said half cycle outputs having the same phase as said positive half cycle outputs of said position detecting elements and exciting the field coils to drive the rotor in the forward direction, thus driving the rotor in the forward direction when the rotor rotates in the forward direction, and for amplifying the positive half cycle outputs of the position detecting elements, said half cycle outputs exciting the field coils to drive the rotor in the forward direction and for amplifying the positive half cycle outputs of the corresponding armature coils, said half cycle outputs having a different phase from said positive half cycle outputs of said position detecting elements and exciting the field coils to drive the rotor in the reverse direction, thus preventing reverse rotation of the rotor when the rotor is applied an external reverse starting torque.

* * * * *